United States Patent
Lee et al.

(10) Patent No.: US 12,394,860 B2
(45) Date of Patent: Aug. 19, 2025

(54) SECONDARY BATTERY

(71) Applicant: Samsung SDI Co., Ltd., Yongin-si (KR)

(72) Inventors: Jong Ha Lee, Yongin-si (KR); Geun Ho Seo, Yongin-si (KR); Shin Jung Kim, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 19 days.

(21) Appl. No.: 17/051,718

(22) PCT Filed: Apr. 15, 2019

(86) PCT No.: PCT/KR2019/004491
§ 371 (c)(1),
(2) Date: Oct. 29, 2020

(87) PCT Pub. No.: WO2019/212164
PCT Pub. Date: Nov. 7, 2019

(65) Prior Publication Data
US 2021/0242528 A1   Aug. 5, 2021

(30) Foreign Application Priority Data
May 2, 2018   (KR) .......................... 10-2018-0050596

(51) Int. Cl.
*H01M 50/342* (2021.01)
*H01M 50/169* (2021.01)
(Continued)

(52) U.S. Cl.
CPC ....... *H01M 50/342* (2021.01); *H01M 50/169* (2021.01); *H01M 50/578* (2021.01); *H01M 50/593* (2021.01)

(58) Field of Classification Search
CPC . H01M 50/342; H01M 50/578; H01M 50/169
(Continued)

(56) References Cited

U.S. PATENT DOCUMENTS 8,071,230 B2   12/2011   Kim et al.
8,378,954 B2   2/2013   Brown
(Continued)

FOREIGN PATENT DOCUMENTS

CN   100413119 C  *  8/2008  .......... H01M 2/0413
CN   201667353 U     12/2010
(Continued)

OTHER PUBLICATIONS

Kim Machine translation (Year: 2018).*
(Continued)

*Primary Examiner* — Matthew T Martin
*Assistant Examiner* — Paul Christian St Wyrough
(74) *Attorney, Agent, or Firm* — Womble Bond Dickinson (US) LLP

(57) ABSTRACT

The present invention relates to a secondary battery capable of improving insulation safety. For example, the secondary battery includes: an electrode assembly; a case configured to accommodate the electrode assembly; and a cap assembly coupled to an upper portion of the case, wherein the cap assembly includes a cap-up, a safety vent installed below the cap-up and having a vent extension part extending to an upper side of the cap-up to surround an edge of the cap-up, and an insulation washer attached to upper portions of the vent extension part and the cap-up, and a welding area having a thickness less than that of surroundings is formed on the vent extension part.

8 Claims, 9 Drawing Sheets

(51) Int. Cl.
*H01M 50/578* (2021.01)
*H01M 50/593* (2021.01)

(58) Field of Classification Search
USPC .......................................................... 429/82
See application file for complete search history.

(56) References Cited

U.S. PATENT DOCUMENTS

| | | | |
|---|---|---|---|
| 8,546,005 | B2 | 10/2013 | Kim |
| 2007/0212595 | A1 | 9/2007 | Kim et al. |
| 2009/0102780 | A1 | 4/2009 | Brown |
| 2010/0159310 | A1 | 6/2010 | Kim |
| 2013/0273401 | A1 | 10/2013 | Lee et al. |
| 2015/0236334 | A1 | 8/2015 | Lee et al. |
| 2020/0295319 | A1* | 9/2020 | Ko .......................... B23K 26/21 |

FOREIGN PATENT DOCUMENTS

| | | | | | |
|---|---|---|---|---|---|
| CN | 103650199 | A | | 3/2014 | |
| CN | 107293687 | A | | 10/2017 | |
| EP | 2911220 | A1 | | 8/2015 | |
| JP | 8-273649 | A | | 10/1996 | |
| JP | H10-340714 | A | | 12/1998 | |
| KR | 10-0878701 | B1 | | 1/2009 | |
| KR | 10-0989840 | B1 | | 10/2010 | |
| KR | 10-2013-0009691 | A1 | | 1/2013 | |
| KR | 10-2013-0028384 | A | | 3/2013 | |
| KR | 2013024576 | A | * | 3/2013 | |
| KR | 10-2014-0106329 | A | | 9/2014 | |
| KR | 10-2016-0040115 | A | | 4/2016 | |
| KR | 20160040115 | A | * | 4/2016 | ............ Y02E 60/10 |
| KR | 10-2016-0144016 | A | | 12/2016 | |
| KR | 10-2017-0012137 | A | | 2/2017 | |
| KR | 10-2018-0005971 | A | | 1/2018 | |
| KR | 10-2018-0093838 | A | | 8/2018 | |
| WO | WO 2007/105861 | A1 | | 9/2007 | |
| WO | WO 2008/049294 | A1 | | 5/2008 | |
| WO | WO-2018056475 | A1 | * | 3/2018 | ........ H01M 10/0525 |
| WO | WO-2018151557 | A1 | * | 8/2018 | ............ H01M 10/04 |

OTHER PUBLICATIONS

KR-2013024576-A (machine translation) (Year: 2013).*
CN-100413119-C (machine translation) (Year: 2008).*
CN100413119C (translation) (Year: 2008).*
EPO Extended Search Report dated Jan. 14, 2022, for corresponding European Patent Application No. 19796894.4 (5 pages).
International Search Report for corresponding International Application No. PCT/KR2019/004491, dated Jul. 22, 2019, 3pp.
Chinese Office action issued in corresponding application No. CN 201980040790.7, Jul. 20, 2022, 10 pages.
Korean Office Action issued in corresponding application No. KR 10-2018-0050596, dated Feb. 2, 2023, 4 pages.

* cited by examiner

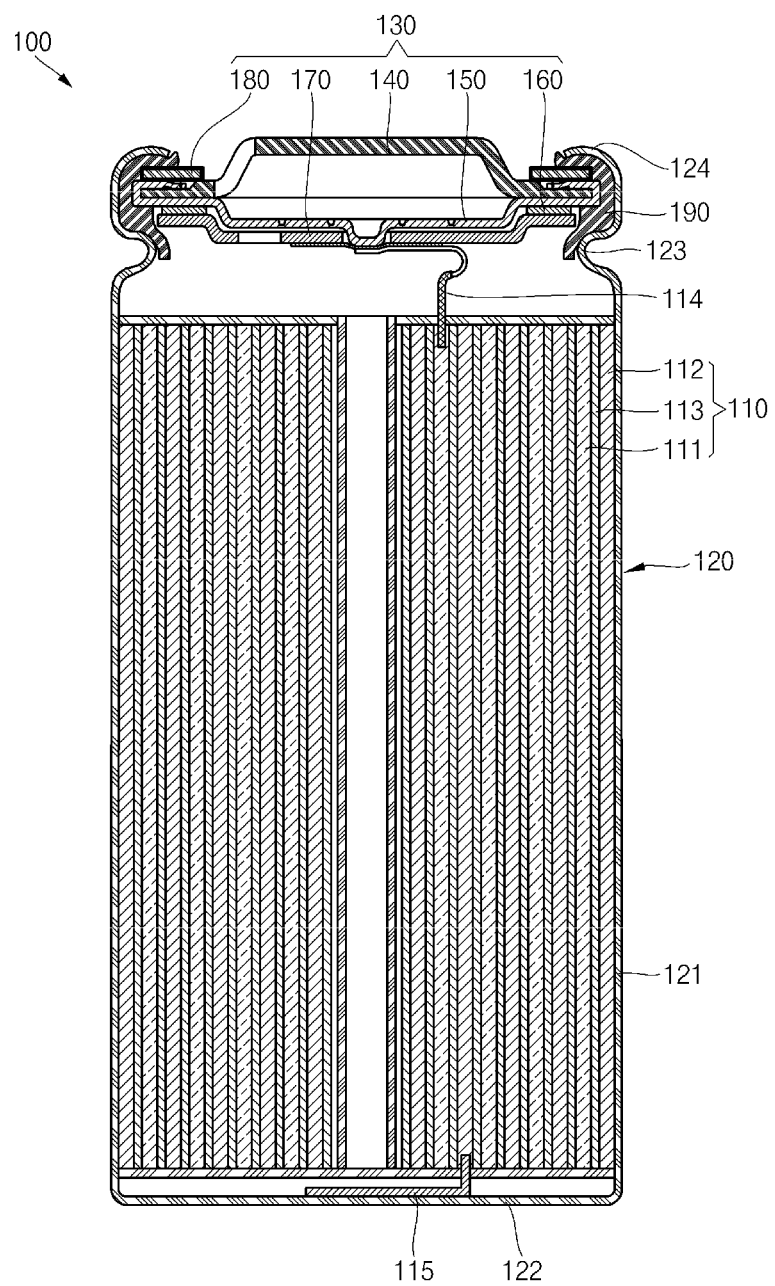
[FIG. 1]

[FIG. 2]
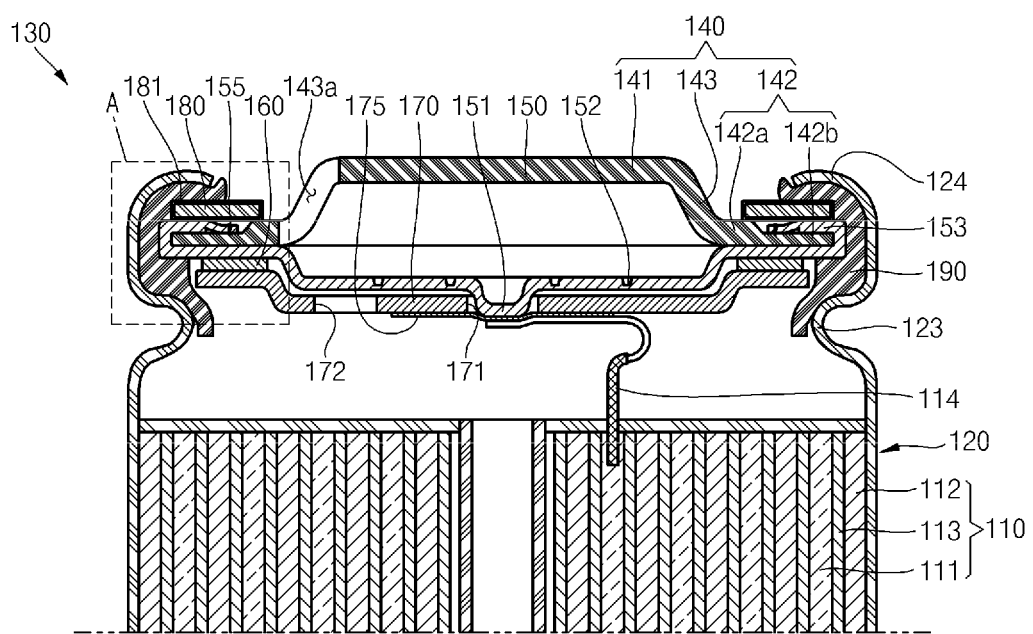

[FIG. 3]
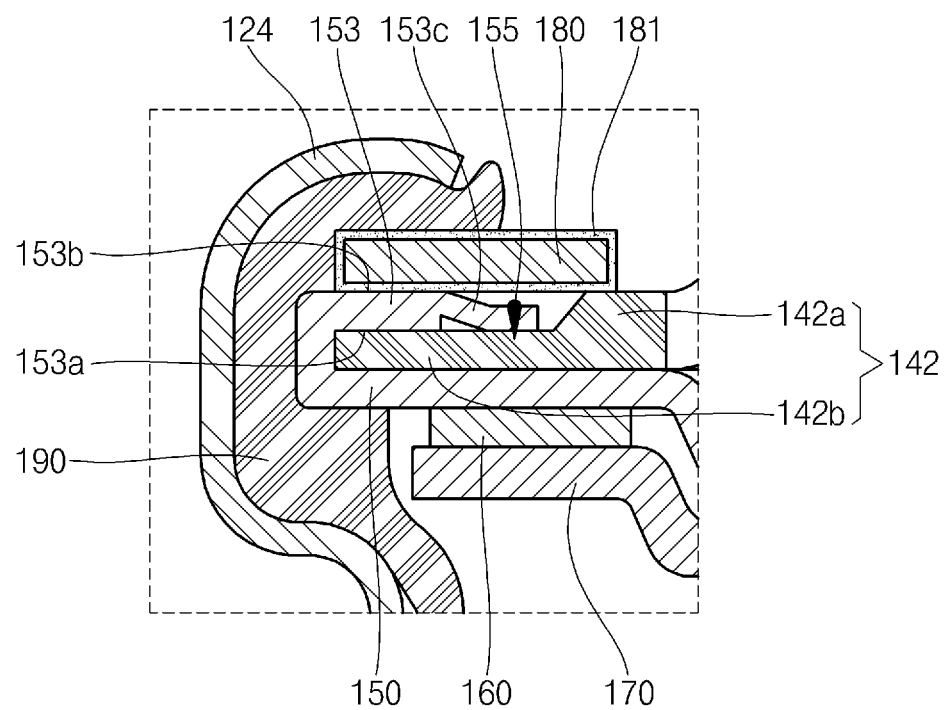

[FIG. 4a]
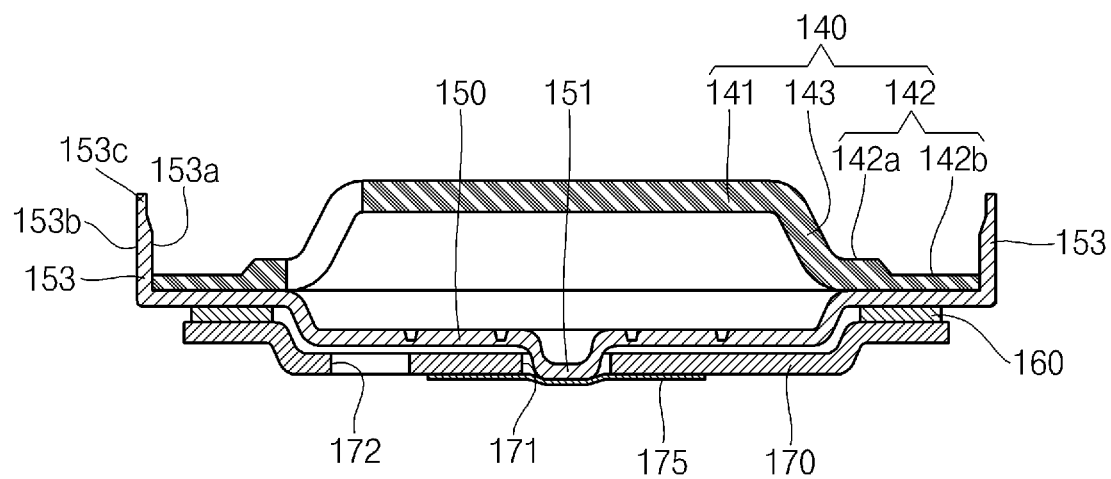

[FIG. 4b]
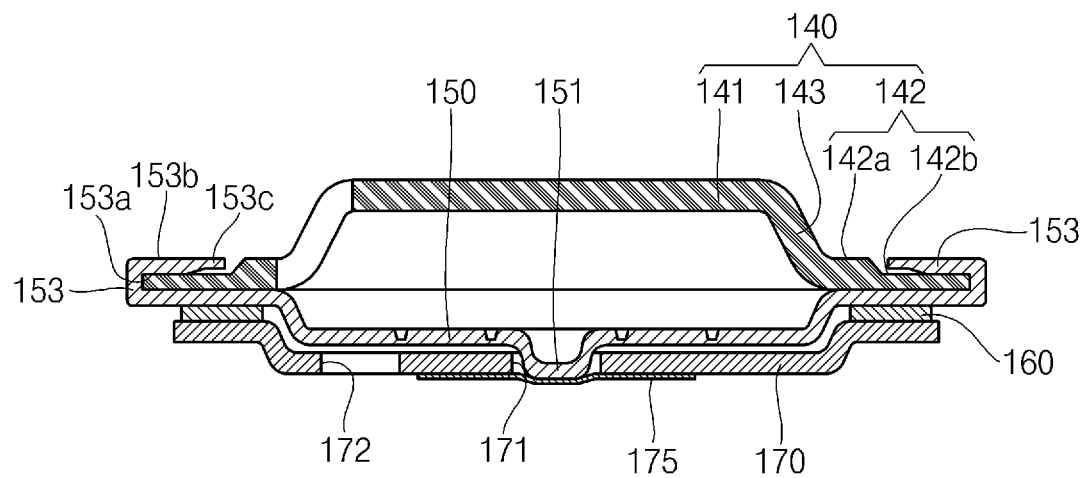

[FIG. 4c]
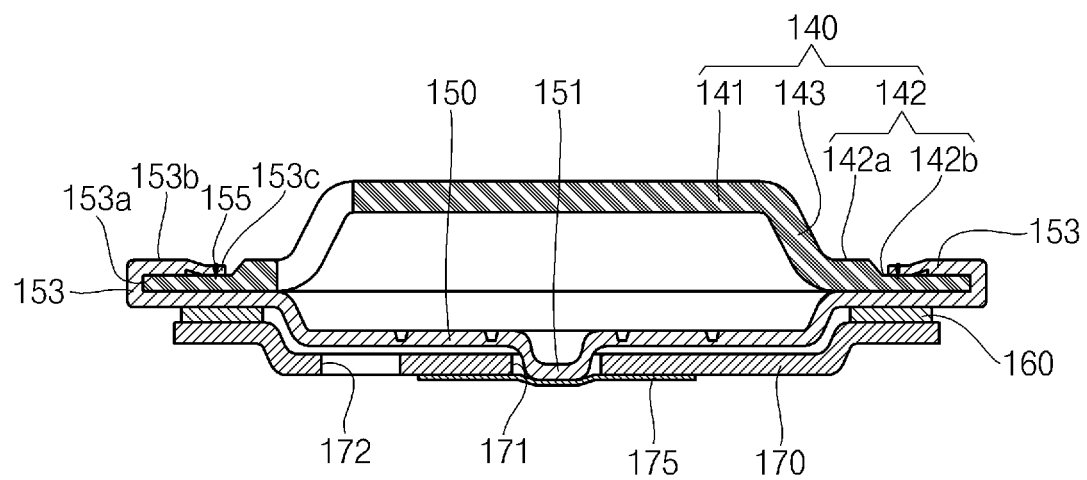

[FIG. 4d]
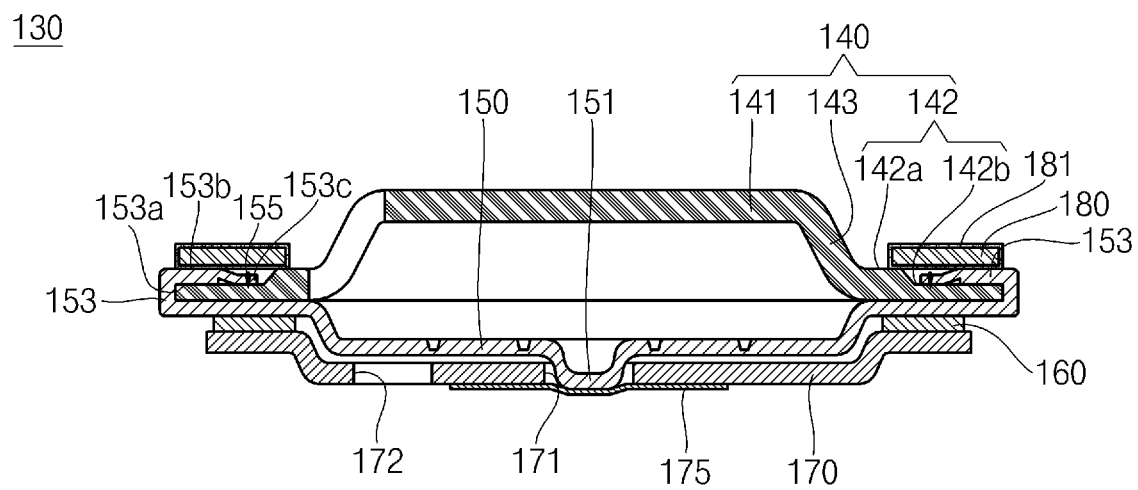

[FIG. 5]
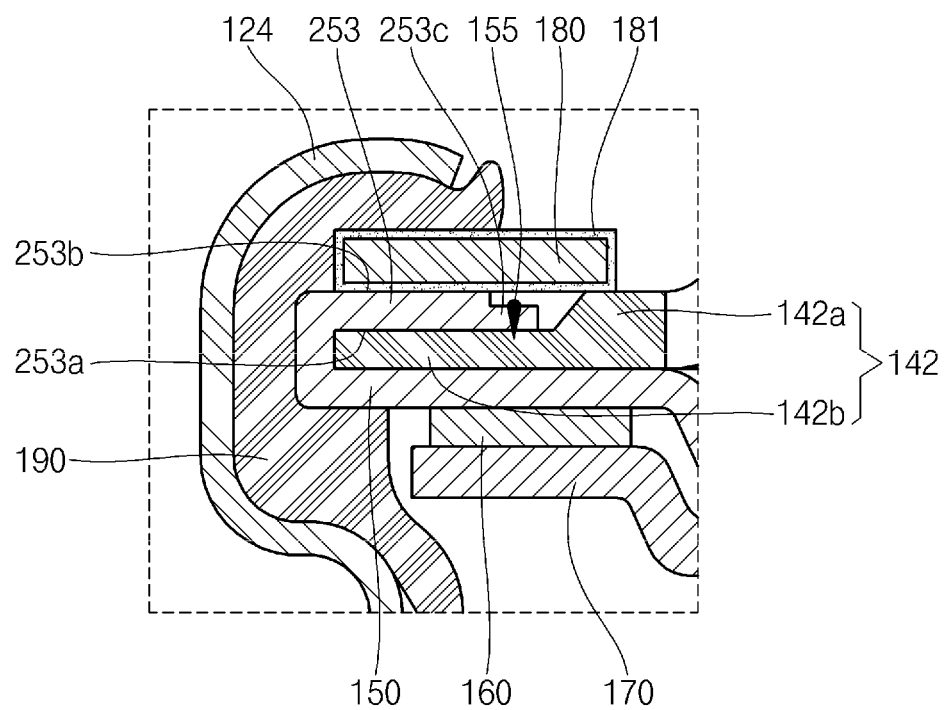

[FIG. 6]
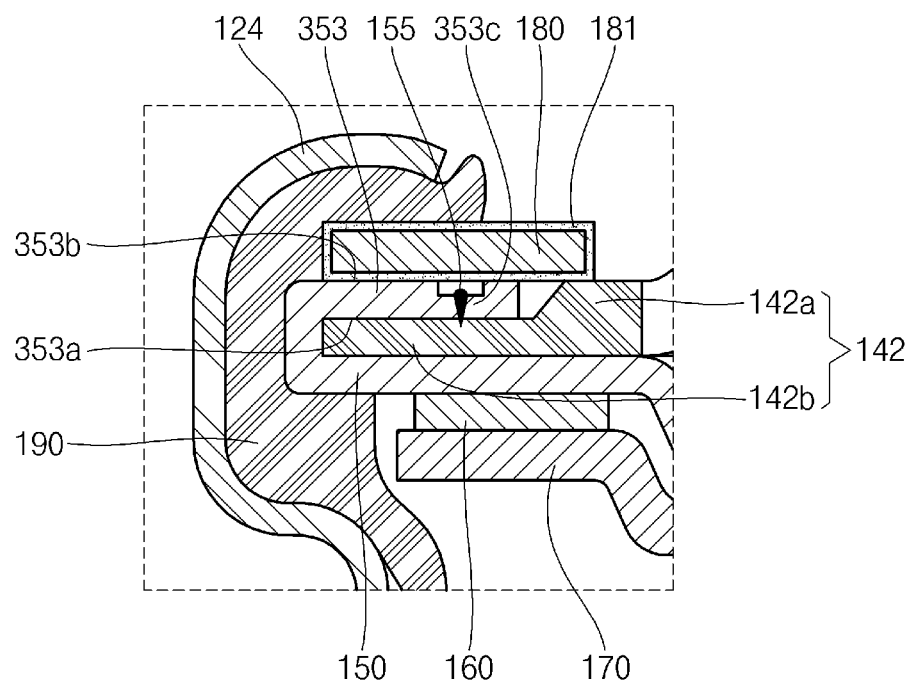

SECONDARY BATTERY

CROSS-REFERENCE TO RELATED APPLICATION(S)

This application is a National Phase Patent Application of International Patent Application Number PCT/KR2019/004491, filed on Apr. 15, 2019, which claims priority of Korean Patent Application No. 10-2018-0050596, filed May 2, 2018. The entire contents of both of which are incorporated herein by reference.

TECHNICAL FIELD

The present invention relates to a secondary battery.

BACKGROUND ART

A secondary battery is a chargeable and dischargeable battery, unlike a primary battery that is not chargeable. Low-capacity secondary batteries are used in portable small electronic devices such as smart phones, feature phones, notebook computers, digital cameras, and camcorders, and large-capacity secondary batteries are widely used for a power source and power storage for driving a motor, such as hybrid vehicles, electric vehicles, and the like. Such lithium ion secondary batteries may be classified into cylindrical, prismatic, and pouch-type secondary batteries.

Particularly, a cylindrical lithium ion secondary battery generally includes a cylindrical electrode assembly, a cylindrical case to which the electrode assembly is coupled, an electrolyte injected into the inside of the case to enable movement of lithium ions, and a cap assembly coupled to one side of the case to prevent the electrolyte from leaking and preventing the electrode assembly from being separated.

The above-described information disclosed in the technology that serves as the background of the present invention is only for improving understanding of the background of the present invention and thus may include information that does not constitute the related art.

DISCLOSURE OF THE INVENTION

Technical Problem

The present invention provides a secondary battery capable of improving insulation safety.

Technical Solution

A secondary battery according to the present invention includes: an electrode assembly; a case configured to accommodate the electrode assembly; and a cap assembly coupled to an upper portion of the case, wherein the cap assembly includes a cap-up, a safety vent installed below the cap-up and having a vent extension part extending to an upper side of the cap-up to surround an edge of the cap-up, and an insulation washer attached to upper portions of the vent extension part and the cap-up, and a welding area having a thickness less than that of surroundings is formed on the vent extension part.

A portion of the safety vent and a portion of the cap-up may be melted by laser welding to form a welding bead, which protrudes upward, on the welding area.

The welding bead may be spaced apart from the insulation washer.

The vent extension part may include a first surface that is in contact with the cap-up and a second surface that is an opposite surface of the first surface and is in contact with the insulation washer, and the welding area may be defined by forming a groove having an opened end in the first surface.

The cap-up may include a terminal part that protrudes upward, a coupling part which is disposed outside the terminal part and to which the safety vent is coupled, and a connection part configured to connect the terminal part to the coupling part, wherein the coupling part may include a first region extending from the connection part and a second region which is disposed outside the first region and has a thickness less than that of the first region and to which the vent extension part is coupled.

The thickness of the first region may be equal to a sum of the thickness of the second region and a thickness of the vent extension part.

The insulation washer may be seated on upper portions of the vent extension part and the first region.

An oxide film may be formed on a surface of the insulation washer.

The vent extension part may include a first surface that is in contact with the cap-up and a second surface that is an opposite surface of the first surface and is in contact with the insulation washer, and the welding area may be defined by forming a groove having an opened end in the second surface.

The vent extension part may include a first surface that is in contact with the cap-up and a second surface that is an opposite surface of the first surface and is in contact with the insulation washer, and the welding area may be defined by forming a trench in the second surface.

Advantageous Effects

In the secondary battery according to the embodiment of the present invention, the thin welding area may be formed in the safety vent to prevent the welding bead from being in contact with the insulation washer. Therefore, when the gasket is melted or damaged, the short circuit between the cap assembly and the case may be prevented to improve the safety of the secondary battery.

BRIEF DESCRIPTION OF THE DRAWINGS

FIG. 1 is a cross-sectional view of a secondary battery according to an embodiment of the present invention.

FIG. 2 is a cross-sectional view of a cap assembly in the secondary battery according to an embodiment of the present invention.

FIG. 3 is an enlarged cross-sectional view illustrating a portion A of FIG. 2.

FIGS. 4A to 4D are cross-sectional views illustrating a method for forming a cap assembly.

FIG. 5 is a cross-sectional view illustrating a welding area of a safety vent according to another embodiment of the present invention.

FIG. 6 is a cross-sectional view illustrating a welding area of a safety vent according to further another embodiment of the present invention.

BEST MODE FOR CARRYING OUT THE INVENTION

Preferred embodiments of the present invention will be described in detail with reference to the accompanying drawings so that those skilled in the art can easily implement the present invention.

Here, throughout the specification, parts having similar configurations and operations are denoted by the same reference numerals. Also, in this specification below, when any portion is referred to as being "connected" to another portion, it should be understood that the former can be "directly connected" to the latter, or "electrically connected" to the latter via an intervening member.

FIG. 1 is a cross-sectional view of a secondary battery according to an embodiment of the present invention.

Referring to FIG. 1, a secondary battery 100 according to an embodiment of the present invention includes an electrode assembly 110, a case 120, a cap assembly 130, and a gasket 190.

The electrode assembly 110 includes a first electrode 111, a second electrode 112, and a separator 113 interposed between the first electrode 111 and the second electrode 112. The electrode assembly 110 may be formed by winding a stack of the first electrode 111, the separator 113, and the second electrode 112 in a jelly-roll form. The first electrode 111 may function as a positive electrode, and the second electrode 112 may function as a negative electrode. A first electrode tab 114 is connected to the cap assembly 130 in an upper portion of the electrode assembly 110, and a second electrode tab 115 is connected to a bottom plate 122 of the case 120 in a lower portion of the electrode assembly 110.

The first electrode 111 is formed by applying a first electrode active material such as a transition metal oxide on a first electrode collector formed of metal foil such as aluminum foil. A first electrode non-coating portion that is not coated with a first electrode active material is formed on the first electrode 111, and a first electrode tab 114 is attached to the first electrode non-coating portion. The first electrode tab 114 has one end, which is electrically connected to the first electrode 111, and the other end, which protrudes upward from the electrode assembly 110 and is electrically connected to the cap assembly 130.

The second electrode 112 is formed by applying a second electrode active material such as graphite or carbon on a second electrode collector made of metal foil such as copper or nickel. A second electrode non-coating portion that is not coated with a second electrode active material is formed on the second electrode 112, and a second electrode tab 115 is attached to the second electrode non-coating portion. The second electrode tab 115 has one end, which is electrically connected to the second electrode 112, and the other end, which protrudes downward from the electrode assembly 110 and is electrically connected to the bottom plate 122 of the case 120.

The separator 113 is disposed between the first electrode 111 and the second electrode 112 to prevent short circuit from occurring and allow lithium ions to be movable. The separator 113 may be formed of polyethylene, polypropylene, or a composite film of polyethylene and polypropylene.

The case 120 includes a side plate 121, which is a cylindrical body having a predetermined diameter to form a space in which the electrode assembly 110 is accommodated, and a bottom plate 122 that seals a lower portion of the side plate 121. An upper opening of the case 120 is opened to be sealed after inserting the electrode assembly 110. Also, a beading part 123 for preventing movement of the electrode assembly 110 is formed at an upper portion of the case 120. Also, a crimping part 124 for fixing the cap assembly 130 and the gasket 190 is formed at the uppermost end of the case 120. The crimping part 124 has a gasket 190 interposed therein and is formed to press the cap assembly 130, thereby preventing the cap assembly 130 from being separated and preventing the electrolyte from leaking.

FIG. 2 is a cross-sectional view of the cap assembly in the secondary battery according to an embodiment of the present invention.

Referring to FIG. 2, the cap assembly 130 includes a cap-up 140, a safety vent 150, an insulator 160, a cap-down 170, and an insulation washer 180.

The cap-up 140 is provided as a circular plate body and includes a terminal part 141 convexly formed at a center thereof, a coupling part 142 disposed on an outer circumference of the terminal part 141, and a connection part 143 connecting the terminal part 141 and the coupling part 142 to each other. The terminal part 141 protrudes upward rather than the coupling part 142 to serve as a terminal electrically connected to an external circuit. The terminal part 141 is electrically connected to the first electrode tab 114 to function as, for example, a positive electrode. The coupling part 142 is disposed on the outer circumference of the terminal part 141, and the safety vent 150 is coupled to the coupling part 142. Also, the coupling part 142 includes a first region 142a disposed inside and connected to the connection part 143 and a second region 142b disposed outside the first region 142a. The second region 142b is formed to be thinner than a thickness of the first region 142a, and thus, a stepped portion occurs between the first region 142a and the second region 142b. A vent extension part 153 of the safety vent 150 is coupled to an upper portion of the second region 142b. Here, a sum of a thickness of the second region 142b and a thickness of the vent extension part 153 is formed to be equal to the thickness of the first region 142a. This is because the insulation washer 180 to be described later is stably seated on upper portions of the first region 142a of the cap-up 140 and the vent extension part 153. The connection part 143 connects the terminal part 141 and the coupling part 142 to each other, and a gas discharge hole 143a is formed in the connection part 143. The gas discharge hole 143a may be formed in plurality in the connection part 143 and provide a passage through which a gas generated inside the case 120 is discharged. Also, a portion of the gas discharge hole 143a may extend to the terminal part 141 and the coupling part 142.

The safety vent 150 is provided as a circular plate body corresponding to the cap-up 140 and is coupled to a lower portion of the cup-up 140. A protrusion 151 protruding downward is formed at a center of the safety vent 150. The safety vent 150 is electrically connected to the sub plate 175 fixed to a lower surface of the cap-down 170 by using the protrusion 151 passing through a through-hole 171 of the cap-down 170. Here, the sub plate 175 and the protrusion 151 of the safety vent 150 may be welded through laser welding, ultrasonic welding, resistance welding, or an equivalent method thereof.

Also, a notch 152 for guiding rupture of the safety vent 150 is formed on the outer circumference of the protrusion 151. The safety vent 150 discharges the internal gas while blocking current when an abnormal internal pressure occurs in the case 120. When the internal pressure of the safety vent 150 is equal to or greater than an operation pressure of the safety vent 150, the protrusion 151 ascends upward by the gas discharged through the gas discharge hole 172 of the cap-down 170 and thus is electrically separated from the sub plate 175. Here, the sub plate 175 is electrically separated from the safety vent 150 while the welded portion of the protrusion 151 is torn. Also, when the internal pressure of the case 120 is greater than or equal to the rupturing pressure that is higher than the operation pressure of the safety vent 150, the notch 152 is ruptured to prevent the secondary battery 100 from being exploded. The safety vent 150 may be made of aluminum (Al).

The safety vent 150 is installed in close contact with the coupling part 142 at the lower portion of the cup-up 140. Also, an edge of the safety vent 150 surrounds the cup-up 140 to extend to an upper side of the cup-up 140. Here, the upward extending portion of the cap-up 140 is defined as a vent extension part 153. Furthermore, an upper portion of the vent extension part 153 is welded using laser to fix the safety vent 150 to the cap-up 140. A portion of the safety vent 150 and a portion of the cap-up 140 are melted by the laser welding to form a welding bead 155. The welding method of the safety vent 150 and the cap-up 140 and the welding bead 155 will be described in more detail below.

The insulator 160 is interposed between the safety vent 150 and the cap-down 170 to insulate the safety vent 150 and the cap-down 170 from each other. Particularly, the insulator 160 is provided in a ring shape and is interposed between an outer circumference of the safety vent 150 and an outer circumference of the cap-down 170. The insulator 160 may be made of a resin material such as polyethylene (PE), polypropylene (PP), polyethylene terephthalate (PET), or the like.

The cap-down 170 is provided as a circular plate body. The through-hole 171 is formed in a center of the cap-down 170, and the protrusion 151 of the safety vent 150 passes through the through-hole 171. Also, the gas discharge hole 172 is formed at one side of the cap-down 170, and a sub plate 175 is coupled to a lower portion of the cap-down 170. The gas discharge hole 172 serves to discharge the internal gas when an excessive internal pressure is generated in the case 120. Here, the protrusion 151 of the safety vent 150 may ascend by the gas discharged through the gas discharge hole 172, and thus, the protrusion 151 may be separated from the sub plate 175. The sub plate 175 is welded between the protrusion 151 of the safety vent 150, which passes through the through-hole 171 of the cap-down 170, and the first electrode tab 114. Accordingly, the sub plate 175 electrically connects the first electrode tab 114 to the safety vent 150.

The insulation washer 180 is provided in a ring shape and is installed on the upper portions of the cap-up 140 and the safety vent 150. Particularly, the insulation washer 180 is disposed on the upper portions of the first region 142a of the cap-up 140 and the vent extension part 153 of the safety vent 150. Here, the insulation washer 180 may be attached to the upper portions of the cap-up 140 and the safety vent 150 through an adhesive member (not shown). The insulation washer 180 serves to prevent an electrical short-circuit between the cap assembly 110 and the case 120. Particularly, the insulation washer 180 may prevent the cap assembly 110 and the case 120 from being short-circuited even if the gasket 190 disposed between the cap assembly 110 and the case 120 is melted or damaged. The insulation washer 180 may be formed by anodizing an aluminum sheet. Here, the anodizing is to oxidize a surface of a metal plate so as to form an oxide film. In general, the most representative material for anodizing is aluminum (Al). In addition, the anodizing may be performed on metal materials such as manganese (Mn), zinc (Zn), titanium (Ti), hafnium (Hf) and niobium (Nb). The oxide film is very hard, has excellent corrosion resistance and abrasion resistance, and is not melted at a high temperature. That is, an oxide film 181 is formed on a surface of the insulation washer 180, and the oxide film 181 prevents an electrical short-circuit between the cap assembly 110 and the case 120.

The gasket 190 is installed in the upper opening of the case 120. That is, the gasket 190 is assembled by being in close contact with the outer circumference of the cap-up 140, the safety vent 150, and the upper opening of the case 120. The gasket 190 may be made of a resin material such as polyethylene (PE), polypropylene (PP), polyethylene terephthalate (PET), or the like. The gasket 190 may electrically insulate the case 120 and the cap assembly 130 from each other.

FIG. 3 is an enlarged cross-sectional view illustrating a portion A of FIG. 2.

As illustrated in FIG. 3, the vent extension part 153 has a first surface 153a in contact with the cap-up 140 and a second surface 153b in contact with the insulation washer 180 on an opposite surface of the first surface 153a. Also, the vent extension part 153 includes a welding area 153c that is welded to the cap-up 140. The welding area 153c is formed on an end of the vent extension part 153 and is disposed inside the safety vent 150. That is, the welding area 153c is disposed at a portion adjacent to the first region 142a in the second region 142b of the cap-up 140. Furthermore, a thickness of the welding area 153c is formed to be relatively thinner than a thickness of the peripheral vent extension part 153. This is to prevent the welding bead 155 formed when welding the welding area 153c to the cap-up 140 from being in contact with the insulation washer 180.

The welding area 153c may be defined by forming a groove having an opened end in the first surface 153a of the vent extension part 153. Accordingly, a stepped portion occurs between the vent extension part 153 and the welding area 153c, and a spaced space exists between the welding region 153c and the cap-up 140. During the welding, the welding area 153c is pressed to be in close contact with the second region 142b of the cap-up 140, and then, the safety vent 150 is fixed to the cap-up 140 by irradiating a laser onto the welding area 153c. A portion of the welding area 153c and a portion of the second region 142b are melted by the laser welding to form the welding bead 155, and the welding bead 155 protrudes to the upper side of the welding area 153c. Here, since the thickness of the welding area 153c is relatively thin compared to the surroundings, the welding area 153c is not in contact with the insulation washer 180 disposed thereon. That is, the welding bead 155 is spaced apart from the insulation washer 180. If the thickness of the welding area is not formed to be thin, the welding bead protrudes to an upper side of the vent extension part and is in contact with the insulation washer. The welding bead breaks the oxide film of the insulation washer by a pressure applied when the crimping part is formed to fix the cap assembly to the case. Accordingly, when the gasket is melted or damaged, the short circuit occurs between the cap assembly and the case. However, in the present invention, the welding bead 155 is not in contact with the insulation washer 180 by forming the welding area 153c having the thin thickness in the safety vent 150 to improve safety of the secondary battery 100.

Furthermore, the following experiment was conducted to confirm safety performance of the secondary battery according to the present invention.

As in the present invention, a secondary battery, in which a welding bead is formed on a safety vent having a thin welding area through laser welding, and an insulation washer is attached to an upper portion of the welding bead, was prepared. Also, in Comparative Example, a secondary battery in which a welding bead is formed on a safety vent having the same thickness through laser welding, and an insulation washer is attached to an upper portion of the welding bead was prepared. It was confirmed whether the secondary batteries were electrically connected after short circuit. This process was repeated 6 times.

The experimental results are summarized in Table 1 below.

TABLE 1

|  | AC-IR after short circuit | Whether being electrically connected after short circuit |
|---|---|---|
| The present invention | Over Flow (∞) | 0/6 |
| Comparative Example | 2~7 mΩ | 6/6 |

As shown in Table 1, it was confirmed that the secondary batteries according to the present invention are not electrically connected after the short circuit in all the six experiments, and the secondary batteries according to Comparative Example are electrically connected after the short circuiting in all the six experiments. As described above, in the secondary battery according to the present invention, the welding area of the safety vent may have the thin thickness to prevent the welding bead and the insulation washer from being in contact with each other, thereby preventing the welding bead and the insulation washer from being electrically re-connected to each other and improving the safety of the secondary battery.

FIGS. 4A to 4D are cross-sectional views illustrating a method for forming a cap assembly.

A method for forming a cap assembly in a secondary battery according to the present invention will be described with reference to FIGS. 4A to 4D.

First, as illustrated in FIG. 4A, an insulator 160 and a safety vent 150 are sequentially seated on an upper portion of the cap-down 170, and a sub plate 175 is welded to a protrusion 151 of the safety vent 150, which is exposed through a through-hole of a cap-down 170. Then, a cap-up 140 is seated on an upper portion of the safety vent 150. Here, in order to seat the cap-up 150 on the upper portion of the safety vent 150, the vent extension part 153 extends upward without being bent. Also, a welding area 153c is formed on an end of the vent extension part 153. A groove having an open end is formed in an inner surface of the welding area 153c, that is, a first surface 153a facing the cap-up 140, and thus, a thickness of the welding area 153c is thinner than that of the surroundings.

Next, as illustrated in FIG. 4B, the vent extension part 153 is bent to be in close contact with the upper portion of the cap-up 140. Particularly, the vent extension part 153 is in contact with a second region 142b of a connection part 142 of the cap-up 140.

Next, as illustrated in FIG. 4C, the welding area 153c is pressed to be in close contact with the second region 142b of the cap-up 140, and the safety vent 150 is fixed to the cap-up 140 through laser welding. A welding bead 155 is formed on the welding area 153c through the laser welding. The welding bead 155 is formed by melting a portion of the safety vent 150 and a portion of the cap-up 140 and protrudes to an upper side of the welding area 153c.

Then, as illustrated in FIG. 4D, an insulation washer 180 is attached to the upper portions of the cap-up 140 and the safety vent 150. Here, since the welding area 153c is formed to be thinner than the surroundings, the welding bead 155 formed on the welding area 153c is not in contact with the insulation washer 180. As described above, the cap assembly 130 is completed, and the completed cap assembly 130 may be coupled and/or fixed together with a gasket 1901 on an upper end of the case 120.

FIG. 5 is a cross-sectional view illustrating a welding area of a safety vent according to another embodiment of the present invention.

Referring to FIG. 5, a safety vent 150 is installed to be in close contact with a coupling part 142 below a cup-up 140 and includes a vent extension part 253 extending to an upper side of the cup-up 140. The vent extension part 253 includes a first surface 253a in contact with the cap-up 140 and a second surface 253b in contact with an insulation washer 180 on a surface opposite to the first surface 253a. Also, the vent extension part 253 includes a welding area 253c that is welded to the cap-up 140. The welding area 253c is formed on an end of the vent extension part 253 and is disposed inside the safety vent 150. The welding area 253c may be defined by forming a groove having an opened end in the second surface 253b of the vent extension part 253. As described above, when the welding area 253c is defined by forming a groove having an open end in the second surface 253b of the vent extension part 253, it is unnecessary to press the welding area 253c when the safety vent 150 and the cap-up 140 are welded to each other.

FIG. 6 is a cross-sectional view illustrating a welding area of a safety vent according to further another embodiment of the present invention.

Referring to FIG. 6, a safety vent 150 is installed to be in close contact with a coupling part 142 below a cup-up 140 and includes a vent extension part 353 extending to an upper side of a cup-up 140. The vent extension part 353 has a first surface 353a in contact with the cap-up 140 and a second surface 153b in contact with an insulation washer 180 on an opposite surface of the first surface 353a. Also, the vent extension part 353 includes a welding area 353c that is welded to the cap-up 140. The welding area 353c may be defined by forming a trench in the second surface 353b of the vent extension part 353. As described above, when the welding area 253c is defined by forming the trench in the second surface 253b of the vent extension part 353, it is unnecessary to press the welding area 353c when a safety vent 150 and a cap-up 140 are welded to each other.

The above-mentioned embodiment is merely an embodiment of the secondary battery, and thus, the present invention is not limited to the foregoing embodiment, and also it will be understood by those of ordinary skill in the art that various changes in form and details may be made therein without departing from the spirit and scope of the present invention as defined by the following claims.

The invention claimed is:
1. A secondary battery comprising:
an electrode assembly;
a case configured to accommodate the electrode assembly; and
a cap assembly coupled to an upper portion of the case, wherein the cap assembly comprises a cap-up, a safety vent installed below the cap-up and having a vent extension part extending to an upper side of the cap-up to surround an edge of the cap-up, and an insulation washer contacting upper portions of both the vent extension part and the cap-up, a bottom surface of the insulation washer and the upper portions of the vent extension part and the cap-up enclosing an opening therebetween, the cap-up contacting the insulation washer, wherein a welding area having a thickness less than that of a first portion of the vent extension part is at an end of the vent extension part, wherein the vent extension part has an angled portion extending from the first portion of the vent extension part to the weld area at an angle relative to the insulation washer, the angled portion having a uniform thickness, and wherein a bottom surface of the vent extension part and an upper surface of the cap-up define a gap therebetween, the angled portion of the vent extension part overlapping the gap in a plan view, and the upper surface extending flatly under an entirety of the vent extension part and the gap.

2. The secondary battery of claim 1, wherein a portion of the safety vent and a portion of the cap-up are melted by laser welding to form a welding bead, which protrudes upward, on the welding area.

3. The secondary battery of claim 2, wherein the welding bead is spaced apart from the insulation washer.

4. The secondary battery of claim 1, wherein the vent extension part comprises a first surface that is in contact with the cap-up and a second surface that is an opposite surface of the first surface and is in contact with the insulation washer, and the welding area is defined by forming a groove having an opened end in the first surface.

5. The secondary battery of claim 1, wherein the cap-up comprises a terminal part that protrudes upward, a coupling part which is disposed outside the terminal part and to which the safety vent is coupled, and a connection part configured to connect the terminal part to the coupling part, wherein the coupling part comprises a first region extending from the connection part and a second region which is disposed outside the first region and has a thickness less than that of the first region and to which the vent extension part is coupled.

6. The secondary battery of claim 5, wherein the thickness of the first region is equal to a sum of the thickness of the second region and a thickness of the vent extension part.

7. The secondary battery of claim 5, wherein the insulation washer is seated on upper portions of the vent extension part and the first region.

8. The secondary battery of claim 1, wherein an oxide film is formed on a surface of the insulation washer.

* * * * *